(12) United States Patent  
Suzuki

(10) Patent No.: US 7,911,506 B2  
(45) Date of Patent: Mar. 22, 2011

(54) IMAGE SENSING APPARATUS AND METHOD OF CONTROLLING THE SAME

(75) Inventor: Satoshi Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 420 days.

(21) Appl. No.: 12/175,975

(22) Filed: Jul. 18, 2008

(65) Prior Publication Data

US 2009/0027516 A1    Jan. 29, 2009

(30) Foreign Application Priority Data

Jul. 23, 2007  (JP) .................................. 2007-191218  
Jul. 14, 2008  (JP) .................................. 2008-182529

(51) Int. Cl.  
*H04N 5/235* (2006.01)

(52) U.S. Cl. ..................................... 348/229.1; 348/300

(58) Field of Classification Search .................... None  
See application file for complete search history.

(56) References Cited

U.S. PATENT DOCUMENTS

| 6,441,684 | B1 * | 8/2002 | Nakamura ........................ 330/9 |
| 7,477,302 | B2 | 1/2009 | Hisamatsu et al. |
| 2003/0197795 | A1 * | 10/2003 | Schinner ....................... 348/255 |
| 2003/0223010 | A1 * | 12/2003 | Kaplinsky et al. ............ 348/362 |
| 2004/0046875 | A1 * | 3/2004 | Itani et al. ................... 348/229.1 |
| 2004/0223064 | A1 | 11/2004 | Sato et al. |
| 2005/0140795 | A1 * | 6/2005 | Hisamatsu et al. ........ 348/222.1 |
| 2005/0168603 | A1 | 8/2005 | Hiyama et al. |
| 2005/0195448 | A1 * | 9/2005 | Llewellyn et al. ............. 358/446 |
| 2006/0028578 | A1 * | 2/2006 | Tanimoto et al. ............. 348/362 |
| 2006/0055795 | A1 * | 3/2006 | Nakai et al. ................ 348/229.1 |

FOREIGN PATENT DOCUMENTS

| JP | 11-331690 A | 11/1999 |
| JP | 2004-147080 A | 5/2004 |
| JP | 2005-167918 A | 6/2005 |
| JP | 2005-217771 | 8/2005 |

* cited by examiner

*Primary Examiner* — Lin Ye  
*Assistant Examiner* — Dennis Hogue  
(74) *Attorney, Agent, or Firm* — Cowan, Liebowitz & Latman, P.C.

(57) ABSTRACT

An image sensing apparatus comprises: an image sensor which converts an optical image of an object into an electrical signal; a first amplifier which amplifies the electrical signal by a first gain; a second amplifier which further amplifies the amplified electrical signal by a second gain that is changeable in finer steps than the first gain; and a control unit which obtains a third gain based on an quantity of incident light to said image sensor and adjusting the first and second gains so that a sum of the first and second gains equals the third gain. The control unit adjusts a gain component of the third gain, which cannot be adjusted by the first gain, using the second gain, and ensures the third gain by adjusting only the second gain when a brightness change more than the preset brightness difference does not continue for not less than a preset time.

7 Claims, 7 Drawing Sheets

IMAGE SENSING APPARATUS AND METHOD OF CONTROLLING THE SAME

BACKGROUND OF THE INVENTION

1. Field of the Invention

The present invention relates to an image sensing apparatus and a method of controlling the same and, more particularly, to sensitivity control of an image sensing apparatus in shooting a moving image.

2. Description of the Related Art

Conventional commercially available image sensing apparatuses such as a digital camera record a still image or moving image sensed by an image sensor such as a CCD or CMOS on a recording medium such as a memory card having memory elements and play back the recorded image.

Many digital cameras have a shooting mode to automatically change the sensitivity in accordance with the brightness of a scene to be taken. This shooting mode enables shooting under appropriate shooting conditions. Especially, an image sensing apparatus such as a digital video camera which shoots and records a moving image automatically controls sensitivity, and the photographer rarely adjusts sensitivity manually in accordance with a change in the brightness of a scene to be taken.

In exposure control of a digital camera, an aperture stop and the like optically controls the quantity of incident light on the image sensor, and a mechanical shutter or electronic shutter temporally controls the quantity of incident light. However, when high-sensitivity setting is necessary because, e.g., the object brightness is low, and it is impossible to obtain a sufficient signal amount by only the optical and temporal exposure control, electrical control is performed by amplifying an electrical signal generated by the photoelectric conversion unit of the image sensor.

A digital camera amplifies an electrical signal by several means. FIG. 7 is a block diagram for explaining an example of the flow of an electrical signal and an amplifier in a conventional image sensing apparatus such as a digital camera.

In an image sensor 201, a plurality of pixels 202 each including a photoelectric conversion unit are arranged. An electrical signal generated in each photoelectric conversion unit passes through a vertical output line and is input to each of column amplifiers 203 which are respectively provided for the columns of the plurality of pixels 202. The gain of the column amplifiers 203 is changeable. The gain often has a discrete set value such as 1×, 2×, 4×, 8×, ... because of, e.g., the restriction of the layout in the image sensor 201 or the restriction of the number of control signal lines to the image sensor 201.

The electrical signal amplified by the column amplifier 203 is input to an output amplifier 204 via a horizontal shift register. The gain of the output amplifier 204 is also changeable. The gain often has a discrete set value because of, e.g., the restriction of the layout in the image sensor 201, like the column amplifiers 203. However, as compared to the column amplifiers 203 which must be provided as many as the columns, the output amplifiers 204 need only be provided as many as the output terminals, and the degree of freedom of gain selection is high.

The electrical signal amplified by the output amplifier 204 is output from the image sensor 201 and input to an analog signal processing circuit (Analog Front End: AFE) 205. The electrical signal input to the analog signal processing circuit 205 undergoes several analog signal processes by a correlated double sampling (CDS) circuit 206 and the like and is input to an analog signal amplifier (Programmable Gain Amplifier: PGA) 207. The gain of the analog signal amplifier 207 is also variable. However, a more continuous gain can be set than with the column amplifier 203 and output amplifier 204 arranged inside the image sensor 201.

The electrical signal amplified by the analog signal amplifier 207 is converted from an analog signal to a digital signal by an A/D conversion unit 208 and then output from the analog signal processing circuit 205 and input to a digital signal processing circuit (Digital Front End: DFE/video engine) 209.

The digital signal processing circuit 209 performs a digital amplification process as well as various kinds of correction processes and developing processes. The gain of the digital amplification process is also variable, and it is possible to more finely and continuously set the gain than by gain setting of the analog signal amplifier 207.

The electrical signal output from the digital signal processing circuit 209 is stored in a memory and used for display on a display device or recording on a recording medium.

Consider the quality of an obtained image. The final noise amount changes depending on the amplification process that has amplified the signal. More specifically, when the column amplifier 203 has amplified the signal, noise that is amplified by the column amplifier 203 together with the signal is only noise generated in the pixels and the vertical output line before the column amplifier 203. None of the noise components generated in the analog signal processing circuit 205, the digital signal processing circuit 209, and the lines which connect these circuits after the horizontal shift register in the image sensor 201 are amplified.

On the other hand, when the digital signal processing circuit 209 has amplified the signal, noise generated in the path prior to the digital signal processing circuit 209 is amplified by the same gain as the signal. Hence, when the digital signal processing circuit 209 has amplified the signal, the final noise amount is larger than that generated by amplification by the column amplifier 203.

That is, when a signal is amplified by an amplifier of a preceding stage, a higher-quality image with less noise can be obtained.

Examine gain adjustment when a change in the quantity of incident light occurs during moving image shooting. When the digital signal processing circuit 209 amplifies the signal, image characteristics such as the sensitivity, noise in the image, and shading change in accordance with the gain applied to the signal. However, since the gain can be finely and continuously set, the gain adjustment is hardly perceivable.

On the other hand, if the column amplifier 203 amplifies the signal, the shading, sensitivity, and the like may not always be proportional to the gain depending on the performance of the image sensor. Additionally, since the gain setting can be set coarsely and discretely, the change in the image characteristics such as visible noise becomes large, and the user may perceive the gain adjustment. As a result, when the object brightness frequently changes, and the gain adjustment frequently occurs, the image may flicker, resulting in annoyance.

For fine and smooth sensitivity setting according to the quantity of incident light, a digital signal processing circuit 209 capable of more continuous gain setting is needed to amplify a signal.

As described above, sensitivity setting of a moving image has the above-described characteristic features depending on the stage of gain change. For this reason, a process of amplifying a signal in a preceding stage using an amplifier arranged in the image sensor is suitable for a still camera which mainly aims at still image shooting with importance on image quality. On the other hand, a process of continuously amplifying a signal using an amplifier in an analog signal processing IC or video engine is suitable for a video camera which mainly aims at moving image shooting with importance on linkage of frames.

More specifically, a surveillance camera needs performance for enabling recognition of, e.g., a human face even in a low illuminance environment. For this purpose, the camera needs to be able to obtain a high-quality moving image at a high sensitivity and also delicately adjust the sensitivity in accordance with a change in the shooting environment. However, if an amplifier in the analog signal processing IC and a video engine amplifies a signal, noise generated at the preceding stage is also amplified, as described above, degrading the image quality. By contrast, an amplifier provided within an image sensor amplifies a signal, since the settable gain value is discrete, the process causes a moving image flicker, resulting in low image quality.

For example, when a person or object crosses in front of the camera in a bright environment, the quantity of incident light on the image sensing apparatus temporarily abruptly decreases and immediately returns to the initial quantity of light. If sensitivity adjustment according to such an abrupt change in the brightness in a short time is done by an amplifier arranged within the image sensor using a discrete gain, the continuity of the image may be poor, resulting in annoying flicker.

SUMMARY OF THE INVENTION

The present invention has been made in consideration of the above situation, and has as its object to do gain setting delicately according to a change in the object brightness during moving image shooting and improve the S/N ratio.

According to the present invention, the foregoing object is attained by providing an image sensing apparatus comprising: an image sensor which converts an optical image of an object into an electrical signal; a first amplifier which amplifies the electrical signal by a first gain; a second amplifier which amplifies, by a second gain, the electrical signal amplified by the first amplifier, the second gain being changeable in finer steps than the first gain; and a control unit which obtains a third gain based on an quantity of incident light to the image sensor and adjusting the first gain and the second gain so that a sum of the first gain and the second gain equals the third gain, wherein the control unit adjusts a gain component of the third gain, which cannot be adjusted by the first gain, using the second gain, and ensures the third gain by adjusting the second gain without adjusting the first gain when a brightness change more than the preset brightness difference does not continue for not less than a preset time.

According to the present invention, the foregoing object is also attained by providing a method of controlling an image sensing apparatus having an image sensor that converts an object image into an electrical signal, comprising: a step of amplifying the electrical signal by a first gain; a step of amplifying, by a second gain, the electrical signal amplified by the first gain, the second gain-being changeable in finer steps than the first gain; a step of setting a third gain based on an quantity of incident light to the image sensor; and a control step of adjusting the first gain and the second gain so that a sum of the first gain and the second gain equals the third gain, wherein in the control step, a gain component of the third gain, which cannot be adjusted by the first gain, is adjusted using the second gain, and the third gain is ensured by adjusting the second gain without adjusting the first gain when a brightness change more than the preset brightness difference does not continue for not less than a preset time.

Further features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings.

First Embodiment

Figure 1:
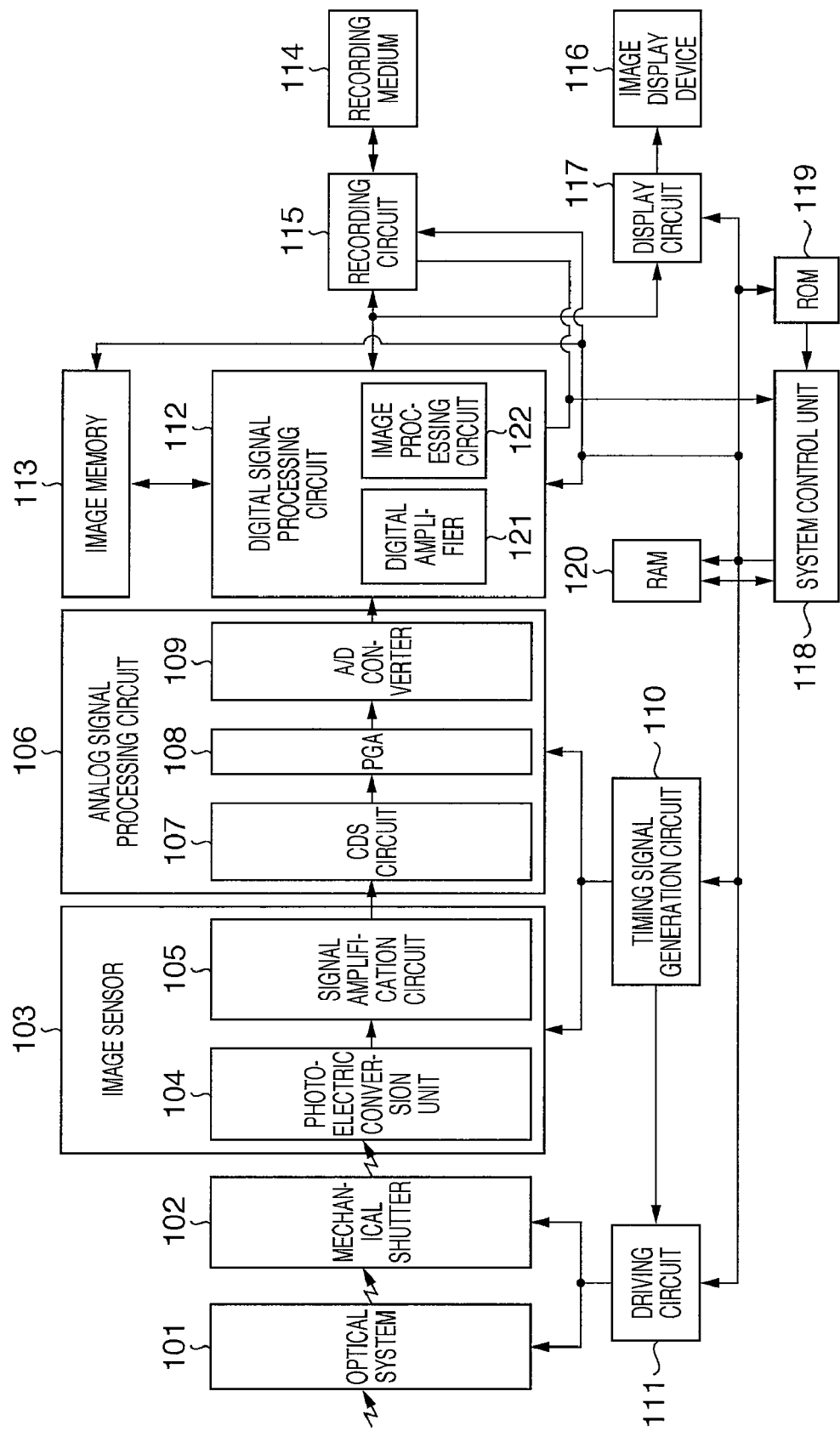
FIG. 1 is a block diagram showing the arrangement of an image sensing apparatus according to a preferred embodiment of the present invention.

FIG. 1 is a block diagram showing the arrangement of an image sensing apparatus according to a preferred embodiment of the present invention.

Reference numeral 101 denotes an optical system including a lens and an aperture stop; and 102, a mechanical shutter. An image sensor 103 converts an optical image of an object into an electrical signal and outputs it. A photoelectric conversion unit 104 converts incident light into an electrical signal (image data) in the image sensor 103. A signal amplification circuit 105 amplifies the electrical signal photoelectrically converted by the photoelectric conversion unit 104 in the image sensor 103. The image sensor 103 outputs the electrical signal amplified by the signal amplification circuit 105. An analog signal processing circuit 106 performs an analog signal process on the electrical signal output from the image sensor 103. A CDS circuit 107 performs correlated double sampling on the electrical signal output from the image sensor 103. A programmable gain amplifier (PGA) 108 amplifies the electrical signal output from the CDS circuit 107 as an analog signal in the analog signal processing circuit 106. An A/D converter 109 converts the electrical signal as an analog signal amplified in the analog signal processing circuit 106 into a digital signal.

A timing signal generation circuit 110 generates a signal for operating the image sensor 103 and the analog signal processing circuit 106. A driving circuit 111 drives the optical system 101 and the mechanical shutter 102. A digital signal processing circuit 112 performs a necessary digital signal process on obtained image data and includes a digital amplifier 121 and an image processing circuit 122.

An image memory 113 stores the image data that has undergone signal processing. A recording medium 114 is detachable from the image sensing apparatus. A recording circuit 115 records, on the recording medium 114, the image data that has undergone signal processing. An image display device 116 displays the image data that has undergone signal processing. A display circuit 117 displays an image on the image display device 116. A system control unit 118 controls the overall image sensing apparatus. A nonvolatile memory (ROM) 119 stores programs which describe the control method to be executed by the system control unit 118, control data such as parameters and tables to be used in executing the programs, and correction data such as defect addresses. A volatile memory (RAM) 120 stores the programs, control data, and correction data transferred from the nonvolatile memory 119 and is used by the system control unit 118 in controlling the image sensing apparatus.

The shooting operation of the image sensing apparatus having the above-described arrangement will be described below. Assume that, before the shooting operation, necessary programs, control data, and correction data are transferred from the nonvolatile memory 119 and stored in the volatile memory 120 at the start of the operation of the system control unit 118 upon, e.g., power-on of the image sensing apparatus. The system control unit 118 uses the programs and data in controlling the image sensing apparatus. Additional programs and data are transferred from the nonvolatile memory 119 to the volatile memory 120 as needed. Alternatively, the system control unit 118 directly reads out and uses the data in the nonvolatile memory 119.

First, the driving circuit 111 drives the aperture stop and lens in the optical system 101 in accordance with a control signal from the system control unit 118 to form an object image on the image sensor 103 with a plurality of pixels being arranged. In still image shooting, the mechanical shutter 102 is driven by a control signal from the system control unit 118 to shield light to the image sensor 103 in accordance with its operation and obtain a necessary exposure time. If the image sensor 103 has an electronic shutter function, it may be used together with the mechanical shutter 102 to ensure the necessary exposure time. At the time of moving image shooting, the mechanical shutter 102 is kept open by a control signal from the system control unit 118 to always expose the image sensor 103 during shooting.

A drive pulse based on an operation pulse generated by the timing signal generation circuit 110 under the control of the system control unit 118 drives the image sensor 103 so that the photoelectric conversion unit 104 photoelectrically converts the object image into an electrical signal. The signal amplification circuit 105 amplifies the electrical signal by a first gain and outputs it as an analog image data. In accordance with an operation pulse generated by the timing signal generation circuit 110 under the control of the system control unit 118, the CDS circuit 107 processes the image data, output from the image sensor 103, from which clock synchronous noise is removed. The image data processed by the CDS circuit 107 is amplified by the programmable gain amplifier 108 by a gain set in accordance with the quantity of incident light (luminance of the object), and then converted into digital image data by the A/D converter 109.

The digital amplifier 121 in the digital signal processing circuit 112 controlled by the system control unit 118 amplifies the digital image signal by a second gain set in accordance with the quantity of incident light. The image processing circuit 122 performs image processing such as color conversion, white balance, and gamma correction; resolution conversion processing; and image compression processing of the digital image data, thereby obtaining image data. The image memory 113 is used to temporarily store the digital image data during signal processing or store the digital image data that has undergone image processing.

The recording circuit 115 converts the image data that has undergone-the signal processing of the digital signal processing circuit 112 or the image data stored in the image memory 113 into data (e.g., file system data having a hierarchical structure) suitable for the recording medium 114, and records the converted data on it. Alternatively, after the resolution conversion processing of the digital signal processing circuit 112, the display circuit 117 converts the image data into a signal (e.g., analog NTSC signal) suitable for the image display device 116 and displays the image on it.

The digital signal processing circuit 112 may directly output the image data to the image memory 113 or recording circuit 115 in accordance with a control signal from the system control unit 118 without executing any signal processing. Upon receiving a request from the system control unit 118, the digital signal processing circuit 112 outputs, to the system control unit 118, information of the image data generated during the process of signal processing. Examples of the information are the spatial frequency of the image, the average value (e.g., luminance information) of image data in a designated area, the data amount of a compressed image, and information extracted from these pieces of information. Upon receiving a request from the system control unit 118, the recording circuit 115 outputs, to the system control unit 118, information of the type and remaining capacity of the recording medium 114. The system control unit 118 also has a function of setting a third gain in accordance with the quantity of incident light and adjusting the first and second gains so that the sum of the first and second gains equals the third gain. The quantity of incident light can be obtained based on, e.g., brightness information obtained from the digital signal processing circuit 112. Then, the third gain for the next frame is determined by also taking the first gain that is applied within the image sensor 103, the gain that is used by the programmable gain amplifier 108, and the second gain that is applied by the digital amplifier 121 into consideration.

A playback operation when image data is recorded on the recording medium 114 will be described next. The recording circuit 115 reads out image data from the recording medium 114 in accordance with a control signal from the system control unit 118. If the image data is a compressed image, the digital signal processing circuit 112 decompresses the image data and stores it in the image memory 113 in accordance with a control signal from the system control unit 118. The digital signal processing circuit 112 converts the resolution of the image data stored in the image memory 113. The display circuit 117 converts the data into a signal suitable for the image display device 116 and displays the image on it.

An example of gain setting according to the quantity of incident light will be described next with reference to FIG. 2.

Figure 2:
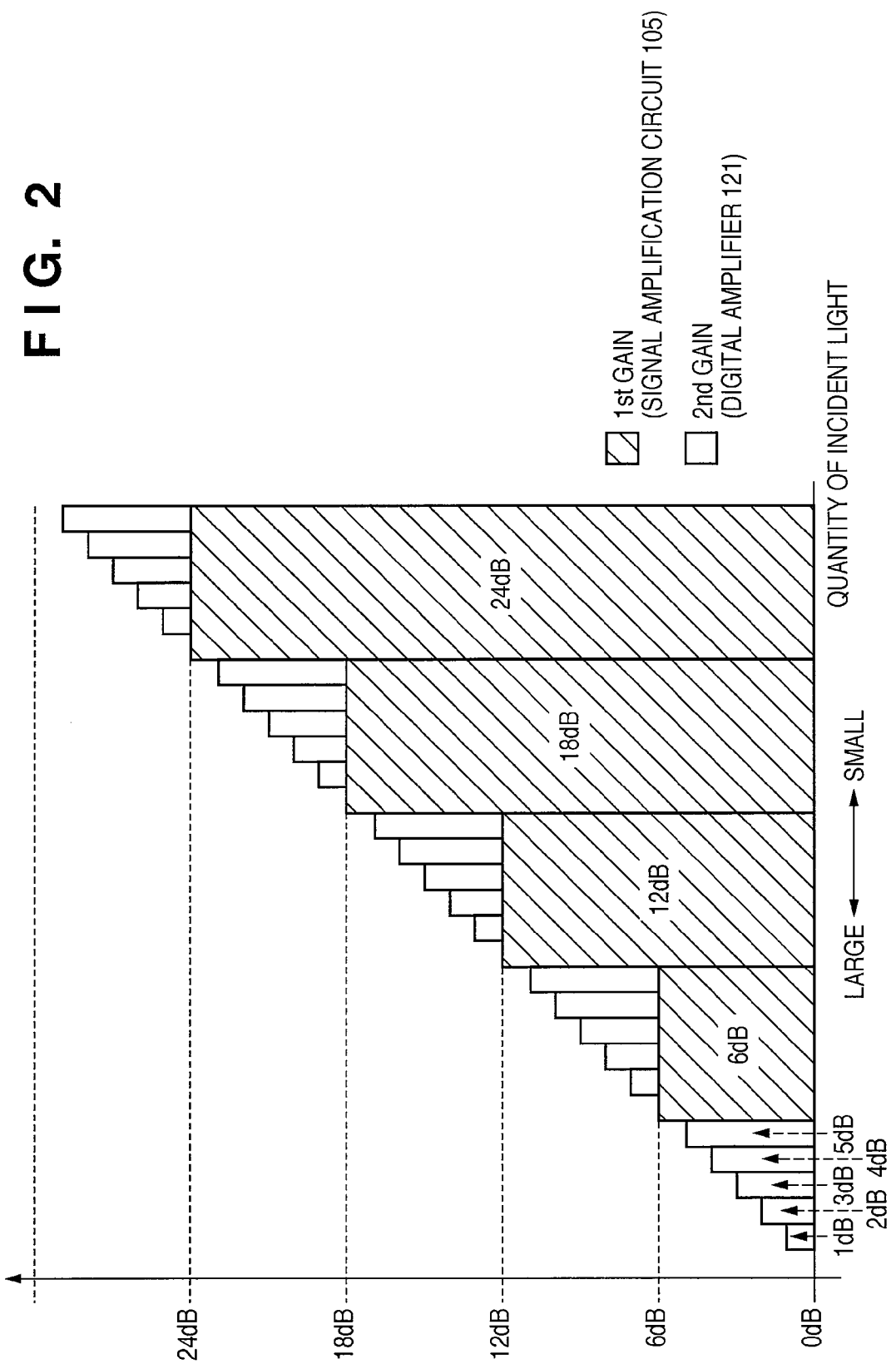
FIG. 2 is a graph for explaining an example of gain setting according to the quantity of incident light according to a first embodiment of the present invention.

In the graph of FIG. 2, the abscissa represents the quantity of incident light. Toward the right in the graph of FIG. 2, the illuminance lowers, and the signal is amplified by a higher gain. In the graph of FIG. 2, the ordinate represents the decibel value (dB) of the gain of each amplifier. In FIG. 2, the signal amplification circuit 105 of the image sensor 103 amplifies the signal by the first gain which can change in steps of, e.g., 6 dB. Gain setting is done such that the digital amplifier 121 of the digital signal processing circuit 112 further amplifies the signal by the second gain which can change in finer steps. The first and second gains are adjusted such that the sum of them equals the third gain which is set in accordance with a change in the brightness of the object image. That is, the gain component of the third gain, which cannot be adjusted by the first gain, is adjusted by the second gain.

For example, to set the third gain at 9 dB in accordance with the change in the brightness of the object image, the first gain is set at 6 dB, and the second gain is set at 3 dB. However, during a preset time after the object brightness has lowered, gain adjustment corresponding to the change in the brightness is done using only the second gain without changing the first gain, as will be described later. When the preset time has elapsed while keeping the object brightness level that has changed, the first gain is also changed. The first and second gains are set in this way, as shown in the graph of FIG. 2, thereby achieving the third gain.

More specifically, for example, immediately after the object brightness has lowered, the second gain is set at, e.g., 9 dB. After the object brightness has stabilized, for example, the first gain is set at 6 dB, and the second gain is set at 3 dB. As shown in FIG. 2, to set a gain of, e.g., 6 dB, the second gain is set at 6 dB immediately after the object brightness has changed. After the object brightness has stabilized, the first gain is set at 6 dB. With this arrangement, in a shooting environment that requires high-sensitivity setting under a low illuminance, amplification by the signal amplification circuit 105 is used to obtain a high-quality image with less noise. On the other hand, to change the gain in accordance with a small change in the quantity of incident light, amplification by a digital signal amplifier is used. This suppresses flicker caused by the change in gain during moving image shooting.

Figure 4:
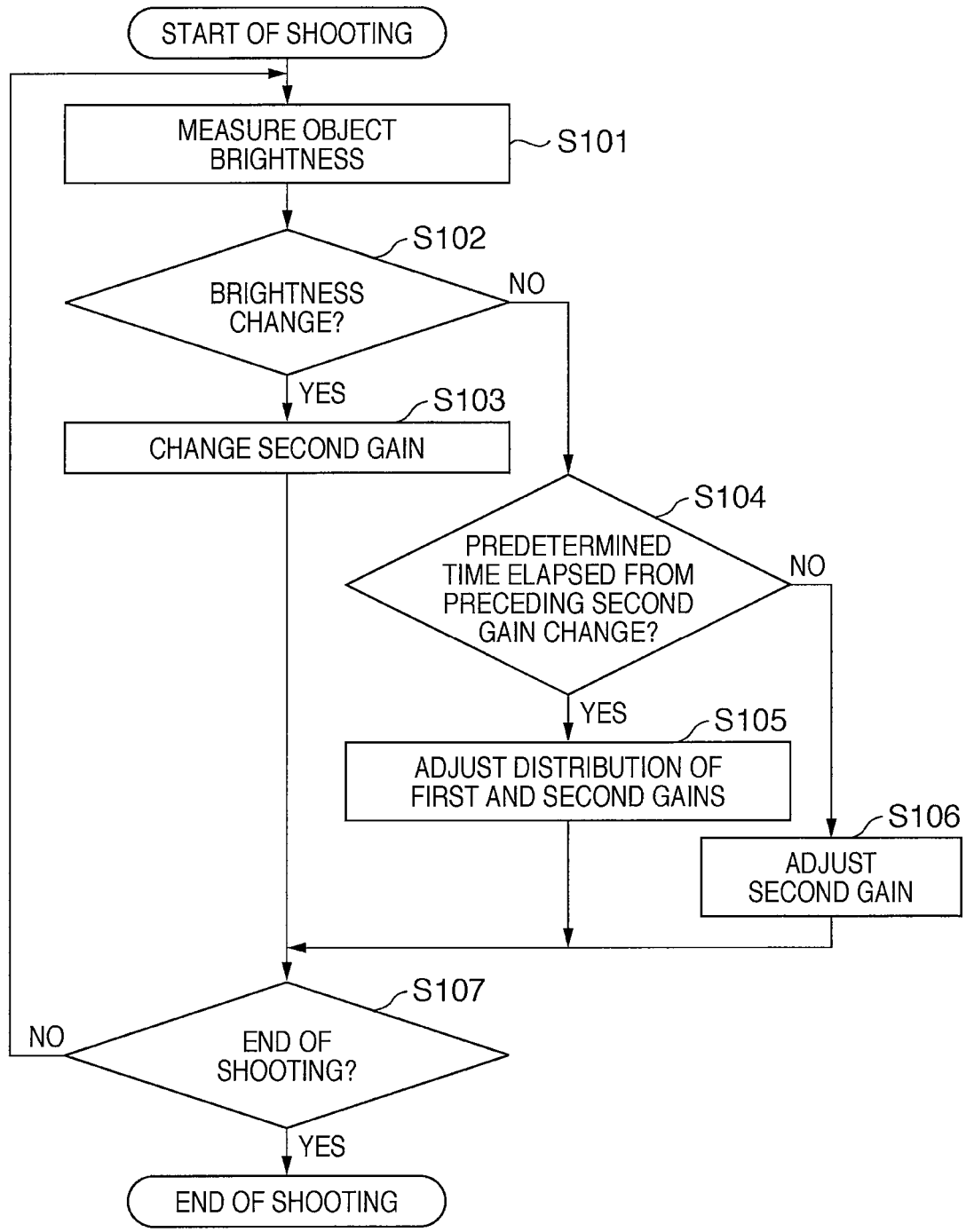
FIG. 4 is a flowchart of a method of controlling the image sensing apparatus according to the first embodiment of the present invention.

FIG. 4 is an example of a flowchart illustrating a method of controlling the image sensing apparatus according to the first embodiment of the present invention. The steps of this flowchart are executed by the system control unit 118 in FIG. 1 unless it is specifically stated otherwise.

Referring to FIG. 4, when shooting starts, the object brightness is measured first (step S101). Next, it is determined whether the brightness has changed from the measured value of the preceding time (step S102). The change in the brightness is determined by determining whether the difference between the preceding measured brightness and the current measured brightness falls within a predetermined range of brightness difference. For example, let $x^n$ (x is a reference dB value) be the third gain that is set latest upon determining that the "brightness has changed". In this case, the predetermined range is the range of brightness change within which the gain needs to be changed within the range of $x^{(n-1)}$ to $x^{(n+1)}$. In step S102, if the brightness difference falls outside the range, it is determined that the object brightness has changed. If the brightness difference falls within the range, it is determined that the object brightness has not changed.

If the object brightness has changed ("YES" in step S102), the second gain of the digital amplifier 121 is changed in accordance with the brightness change amount (step S103), and the process advances to step S107. In step S103, the gain adjustment using the signal amplification circuit 105 described with reference to FIG. 2 is not performed. The adjustment is done using only the second gain of the digital amplifier 121.

If the object brightness has not changed ("NO" in step S102), it is determined whether a predetermined time has elapsed from the latest time of determining that the "brightness has changed" (step S104). The predetermined time may be appropriately set for, e.g., each of image sensing modes or each of image sensing apparatuses in accordance with, e.g., the purpose of shooting, the characteristics of the image sensing apparatus, or the user's taste.

If the predetermined time has elapsed ("YES" in step S104), the distribution of the first and second gains of the signal amplification circuit 105 and digital amplifier 121 is adjusted to ensure predetermined desired settings as described with reference to FIG. 2 (step S105). Then, the process advances to step S107.

If it is determined by the time determination in step S104 that the predetermined time has not elapsed (i.e., the change in the brightness has not continued for the predetermined time or more) ("NO" in step S104), the process advances to step S106. The second gain of the digital amplifier 121 is adjusted, as needed, in accordance with the measured object brightness, and the process advances to step S107.

In step S107, it is determined whether to finish the shooting. If shooting is not to finish ("NO" in step S107), the process returns to step S101 to measure the object brightness again, and the above-described process is repeated. If shooting is to finish ("YES" in step S107), the shooting is immediately ended. Gain control is done in the above-described way.

Effects obtained using the gain control described in FIG. 4 will be explained next with reference to FIGS. 5A to 5C and FIGS. 6A to 6C.

Figure 5C:
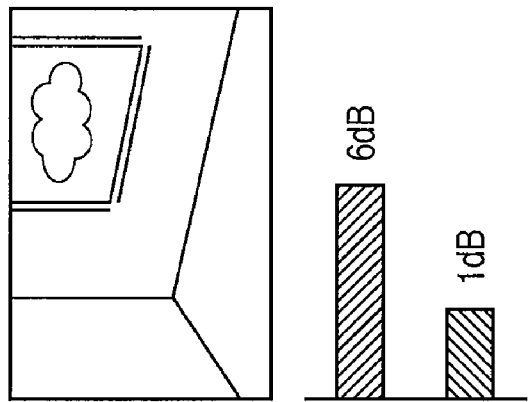
FIGS. 5A to 5C are views for explaining an example of the operation of the image sensing apparatus according to the first embodiment of the present invention.
Figure 5B:
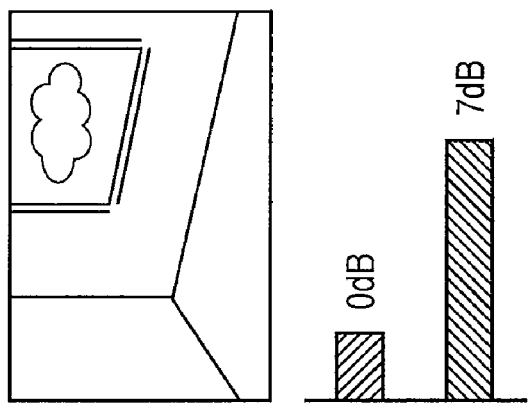
Figure 5A:
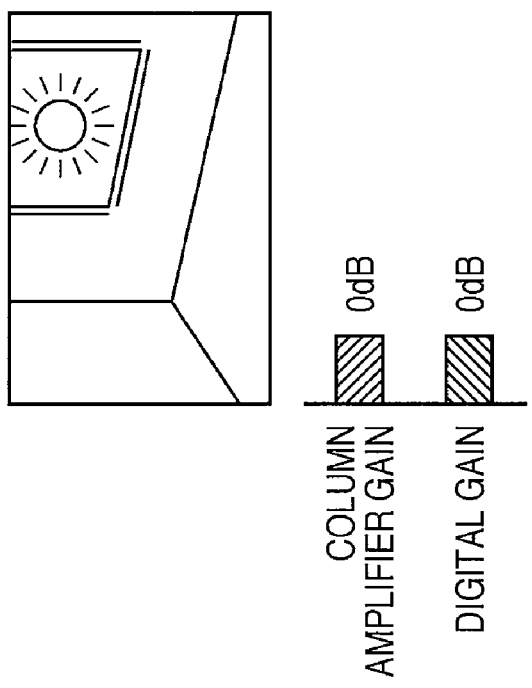

FIGS. 5A to 5C are views for explaining the process of gain control when the object brightness changes from a bright state to a dark state. The image sensing apparatus to be described with reference to FIGS. 5A to 5C is assumed to adjust the sensitivity using the gains of two amplifiers, i.e., the digital amplifier 121 and the signal amplification circuit 105 of the image sensor 103, as described with reference to FIG. 2.

FIG. 5A shows a state in which the image sensing apparatus is shooting the interior of a bright room open to sunshine. In this case, both the first gain of the signal amplification circuit 105 and the second gain of the digital amplifier 121 are set at "0 dB".

FIG. 5B shows a state in which the sun has got behind the clouds, and the shooting environment has darkened just after the state in FIG. 5A. In this case, sensitivity adjustment is performed to ensure an adequate output. The second gain is set at, e.g., "7 dB".

FIG. 5C shows a state in which a predetermined time has elapsed while the brightness state in FIG. 5B being continued. In this case, the first gain is adjusted to "6 dB", and the second gain is adjusted to, e.g., "1 dB" to ensure the gain distribution shown in FIG. 2.

In a shooting environment in which a stable brightness state changes to another stable brightness state, as indicated by the series of brightness changes in FIGS. 5A to 5C, the image sensing apparatus executes sensitivity adjustment mainly using the first gain eventually. It is therefore possible to obtain a high-quality image with less noise even under a situation which requires high-sensitivity setting.

Figure 6C:
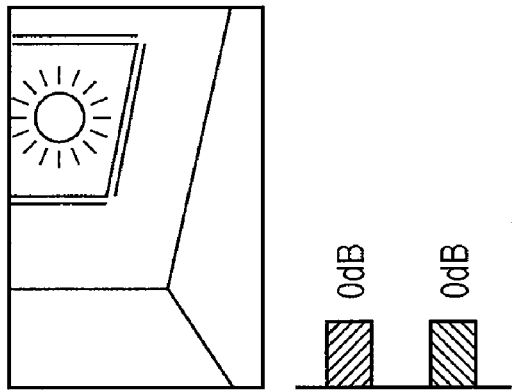
FIGS. 6A to 6C are views for explaining another example of the operation of the image sensing apparatus according to the first embodiment of the present invention.
Figure 6B:
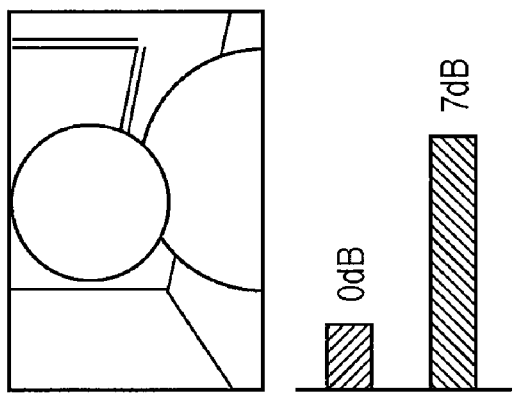
Figure 6A:
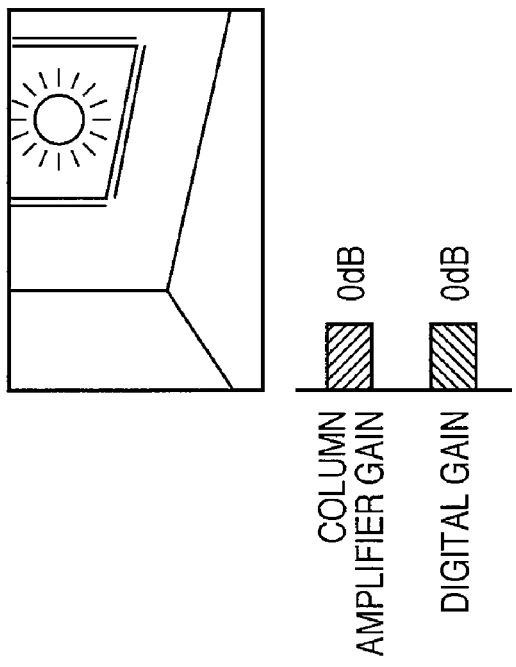

FIGS. 6A to 6C are views for explaining the process of gain control when a person crosses in front of the image sensing apparatus in a shooting environment bright to some extent. Like the image sensing apparatus in FIGS. 5A to 5C, the image sensing apparatus to be described with reference to FIGS. 6A to 6C is also assumed to adjust the sensitivity using the gains of two amplifiers, i.e., the digital amplifier 121 and the signal amplification circuit 105 of the image sensor 103.

FIG. 6A shows a state in which the image sensing apparatus is shooting the interior of a bright room, as in FIG. 5A. In this case, both the first and second gains are set at "0 dB".

FIG. 6B shows a state in which the quantity of incident light temporarily decreases because of a person who is going across in the shooting environment in FIG. 6A, and sensitivity adjustment is necessary, as in FIG. 5B. In this case as well, sensitivity adjustment is performed to ensure an adequate output. The second gain is set at, e.g., "7 dB".

FIG. 6C shows a state in which the person in FIG. 6B has gone past, and the state in FIG. 6A is restored. Since the shooting environment has brightened again, the second gain is returned to "0 dB".

As described above, in a shooting environment in which the brightness temporarily changes, as indicated by the series of brightness changes in FIGS. 6A to 6C, the image sensing apparatus executes sensitivity adjustment using only the second gain. It is therefore possible to obtain a smooth moving image without annoying flicker at the time of gain change.

As described above with reference to FIGS. 5A to 6C, the image sensing apparatus according to the preferred embodiment of the present invention can suppress degradation in the S/N ratio at a high sensitivity and delicately perform appropriate automatic sensitivity setting in accordance with a change in the ambient environment of an object.

The image sensing apparatus according to the preferred embodiment of the present invention has been described above with reference to FIGS. 1, 2, and 4 to 6C. However, the present invention is not limited to this and can take various forms.

For example, to adjust the gain distribution in accordance with a change in the brightness, the first gain is changed from "0 dB" to "6 dB", and the second gain is changed from "7 dB" to "1 dB" in the above description made with reference to FIGS. 5A to 5C. However, for example, the second gain may be changed stepwise from "0 dB" to "3 dB" and then to "6 dB". The remaining gains including the first gain can also be changed stepwise.

In the first embodiment, the gain used by the signal amplification circuit 105 is the first gain, and that used by the digital amplifier 121 is the second gain. However, amplifiers to be used for gain adjustment are not limited to those described above. For example, it is also possible to change the gain of the programmable gain amplifier 108. In this case, the gain of the programmable gain amplifier 108 can be defined as the second gain. Alternatively, the gain of the programmable gain amplifier 108 may be defined as the first gain.

Second Embodiment

The second embodiment of the present invention will be described next.

In the above first embodiment, as described with reference to FIGS. 5A to 6C, the gain distribution is adjusted in accordance with a change in the brightness by using two gains, i.e., the first and second gains as described with reference to FIG. 2. In the second embodiment, three or more amplifiers including a programmable gain amplifier 108 of an analog signal processing circuit 106 shown in FIG. 3 and any other available amplifiers may be used.

Figure 7:
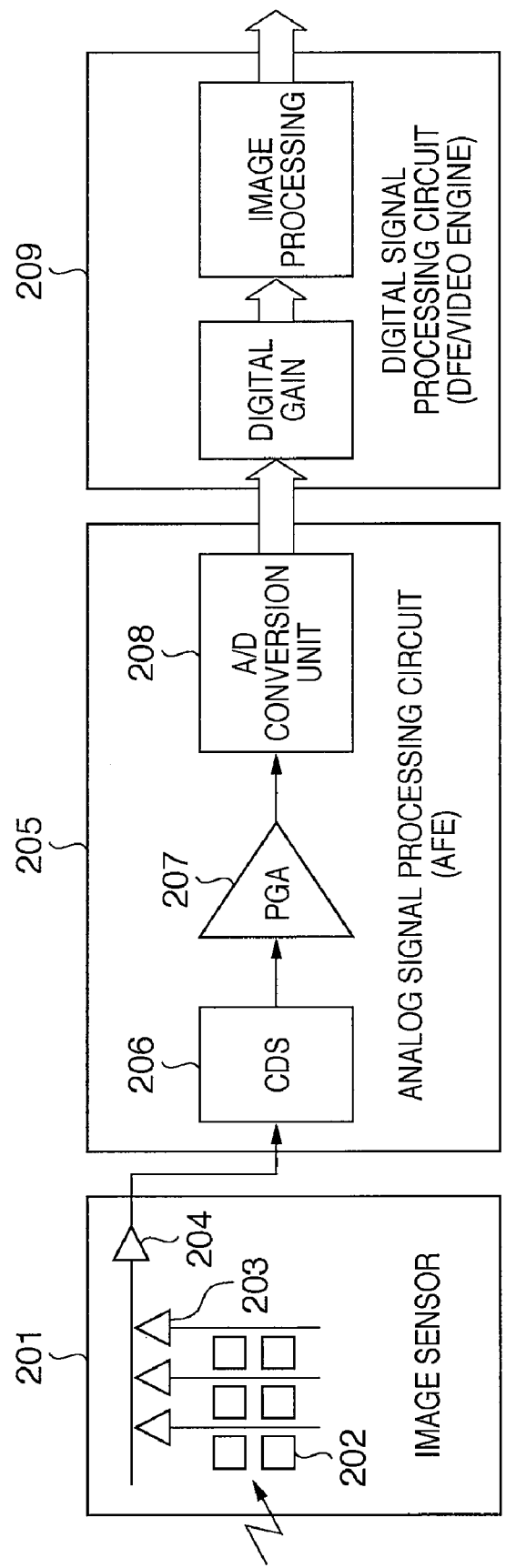
FIG. 7 is a block diagram for explaining an example of the flow of an electrical signal and an amplifier in a conventional image sensing apparatus.

Another example of gain setting according to the quantity of incident light will be described with reference to FIG. 3. In the second embodiment, column amplifiers and an output amplifier arranged at the succeeding stage of the column amplifiers are included as a signal amplification circuit 105 in an image sensor 103, like the image sensor 201 shown in FIG. 7, and denoted by the same reference numerals as in FIG. 7.

Figure 3:
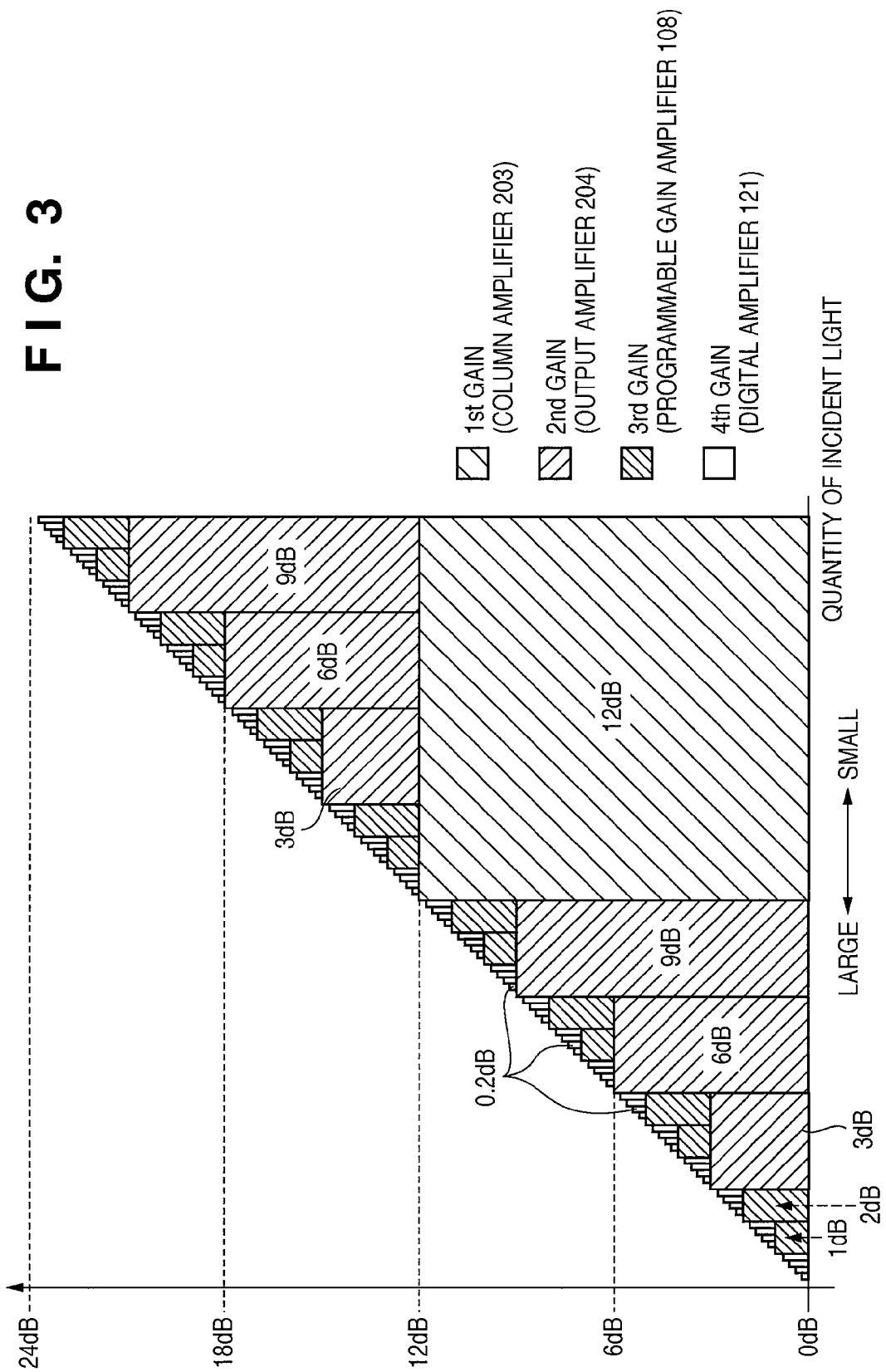
FIG. 3 is a graph for explaining an example of gain setting according to the quantity of incident light according to a second embodiment of the present invention.

Referring to FIG. 3, gain setting in steps of 12 dB (first gain) in a column amplifier 203 and gain setting in steps of 3 dB (second gain) in an output amplifier 204 are used. Additionally, gain setting in steps of 1 dB (third gain) in the programmable gain amplifier 108 in the analog signal processing circuit 106 and gain setting in finer steps of 0.2 dB (fourth gain) in a digital amplifier 121 in a digital signal processing circuit 112 are used.

For example, to amplify a signal by a gain of 16.2 dB, the first gain is set at 12 dB, the second gain is set at 3 dB, the third gain is set at 1 dB, and the fourth gain is set at 0.2 dB. In this case as well, the fourth gain is set at, e.g., 16.2 dB immediately after the object brightness has changed, as in the above-described first embodiment in FIG. 2. After the object brightness has stabilized, the gains of the amplifiers are adjusted to the above distribution. With this arrangement, it is possible to obtain a high-quality image without flicker, as in gain setting described with reference to FIG. 2. Additionally, since the number of gain-stages of the column amplifier 203 decreases, the circuit scale of the image sensor 103 can be small. The use of the programmable gain amplifier 108 also allows to suppress the maximum value of the gain of the digital amplifier 121 and reduce the noise amount in fine gain setting.

In the first and second embodiments, two examples of gain setting according to the quantity of incident light have been described with reference to FIGS. 2 and 3. However, the present invention is not limited to those. It is possible to set each of the gains of the column amplifiers 203 and output amplifier 204 of the image sensor 103, the programmable gain amplifier 108 of the analog signal processing circuit 106, and the digital amplifier 121 of the digital signal processing circuit 112 in accordance with the characteristic features of the image sensing apparatus that includes the amplifiers. The gain values shown in FIGS. 2 and 3 are merely examples. The present invention is not limited to those, and the gain values are changeable as needed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-191218, filed on Jul. 23, 2007 and 2008-182529 filed on Jul. 14, 2008, which are hereby incorporated by reference herein in their entirety.

What is claimed is:

1. An image sensing apparatus comprising:
an image sensor which converts an optical image of an object into an electrical signal;
a first amplifier which amplifies the electrical signal by a first gain;
a second amplifier which amplifies, by a second gain, the electrical signal amplified by said first amplifier, the second gain being changeable in finer steps than the first gain; and
a control unit which sets a third gain based on brightness of the object, and adjusts the first gain and the second gain so that a sum of the first gain and the second gain equals the third gain, and adjusts the second gain so that a part of the second gain that cannot be adjusted by the first gain is adjusted by the second gain,
wherein said control unit adjusts the distribution between the first gain and the second gain in a case where the brightness change of the object does not go beyond a preset range of a brightness difference and a predetermined period of time has passed since the brightness change is last determined, otherwise and said control unit adjusts the second gain without adjusting the first gain.

2. The apparatus according to claim 1, wherein said image sensor has a plurality of pixels, and said first amplifier includes column amplifiers respectively arranged in correspondence with columns of the plurality of pixels.

3. The apparatus according to claim 1, wherein said first amplifier includes an output amplifier arranged in said image sensor.

4. The apparatus according to claim 1, wherein said first amplifier includes an analog amplifier arranged at a succeeding stage of said image sensor.

5. The apparatus according to claim 1, wherein said second amplifier includes an analog amplifier arranged at a succeeding stage of said image sensor.

6. The apparatus according to claim 1, wherein said second amplifier includes a digital amplifier arranged at a succeeding stage of said image sensor.

7. A method of controlling an image sensing apparatus having an image sensor that converts an object image into an electrical signal, a first amplifier which amplifies the electrical signal by a first gain, and a second amplifier which amplifies, by a second gain, the electrical signal amplified by said first amplifier, the second gain being changeable in finer steps than the first gain, said method comprising:

a step of setting a third gain based on brightness of the object; and a control step of adjusting the first gain and the second gain so that a sum of the first gain and the second gain equals the third gain, and further adjusting the second gain so that a part of the second gain that cannot be adjusted by the first gain is adjusted by the second gain, wherein in the control step, the distributions of the first gain and the second gain are adjusted in a case where the brightness change of the object does not go beyond a preset range of a brightness difference and a predetermined period of time has passed since the brightness change is last determined, otherwise the second gain is adjusted without the first gain being adjusted.

* * * * *